United States Patent Office 3,394,857
Patented July 30, 1968

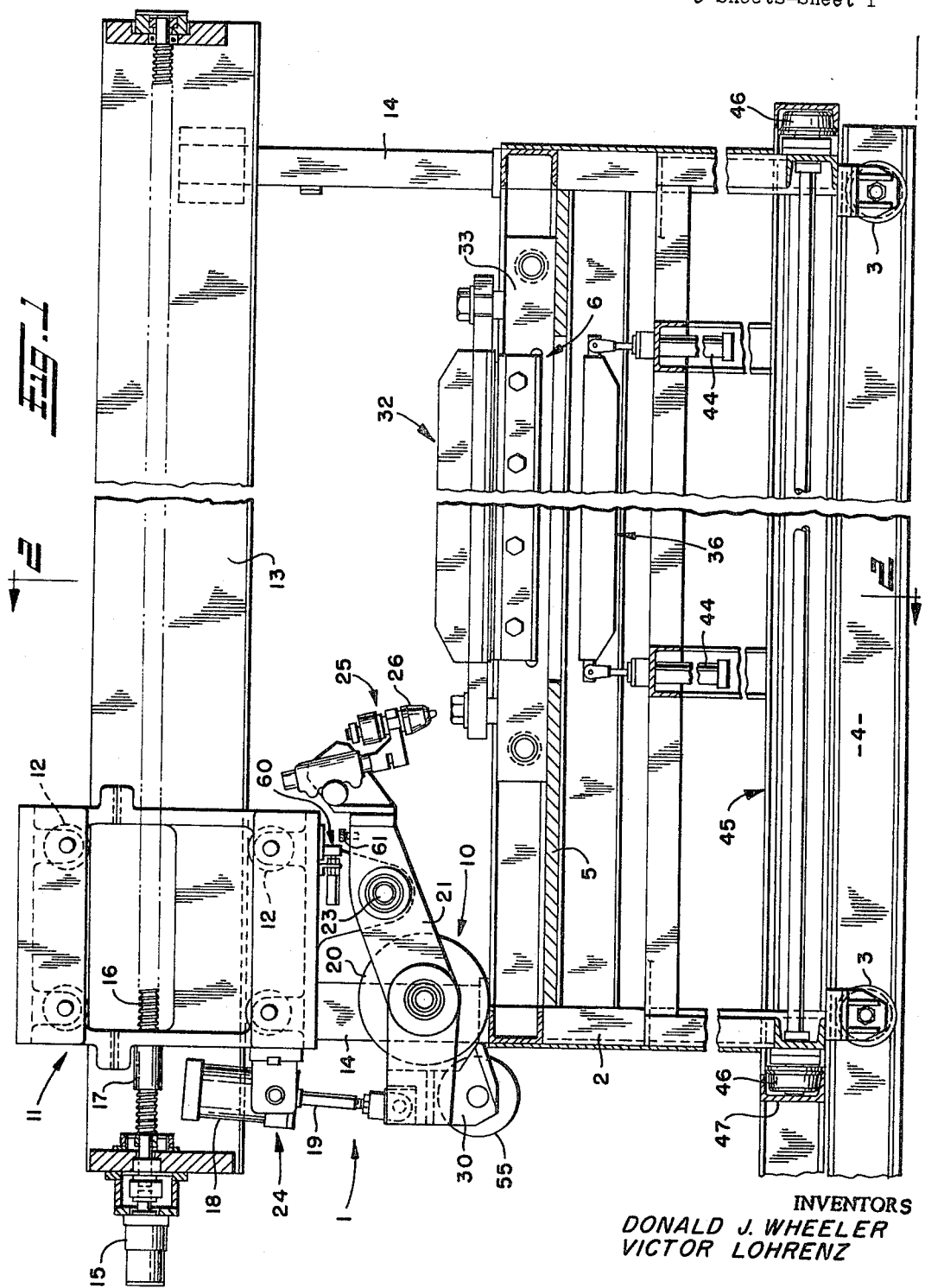

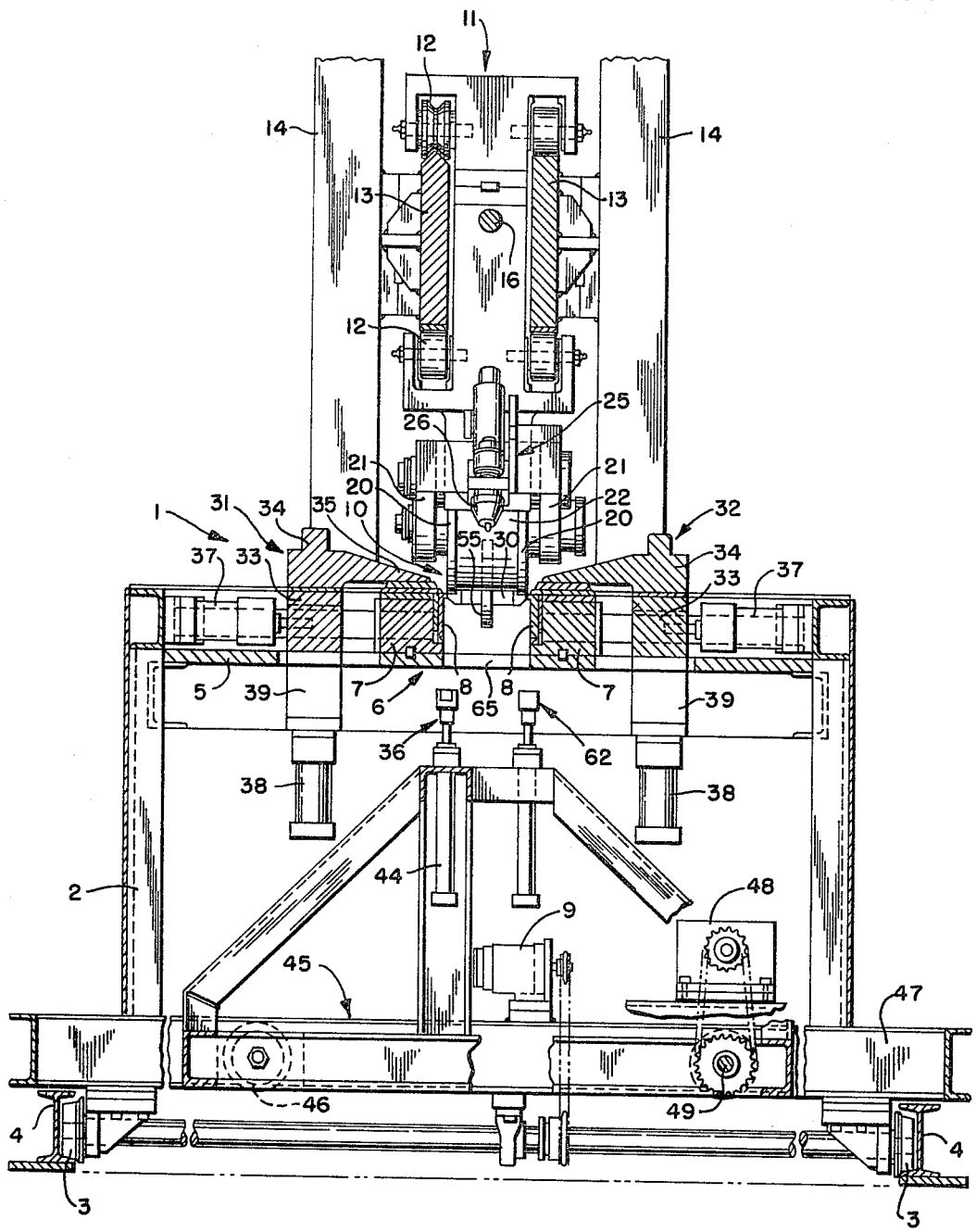

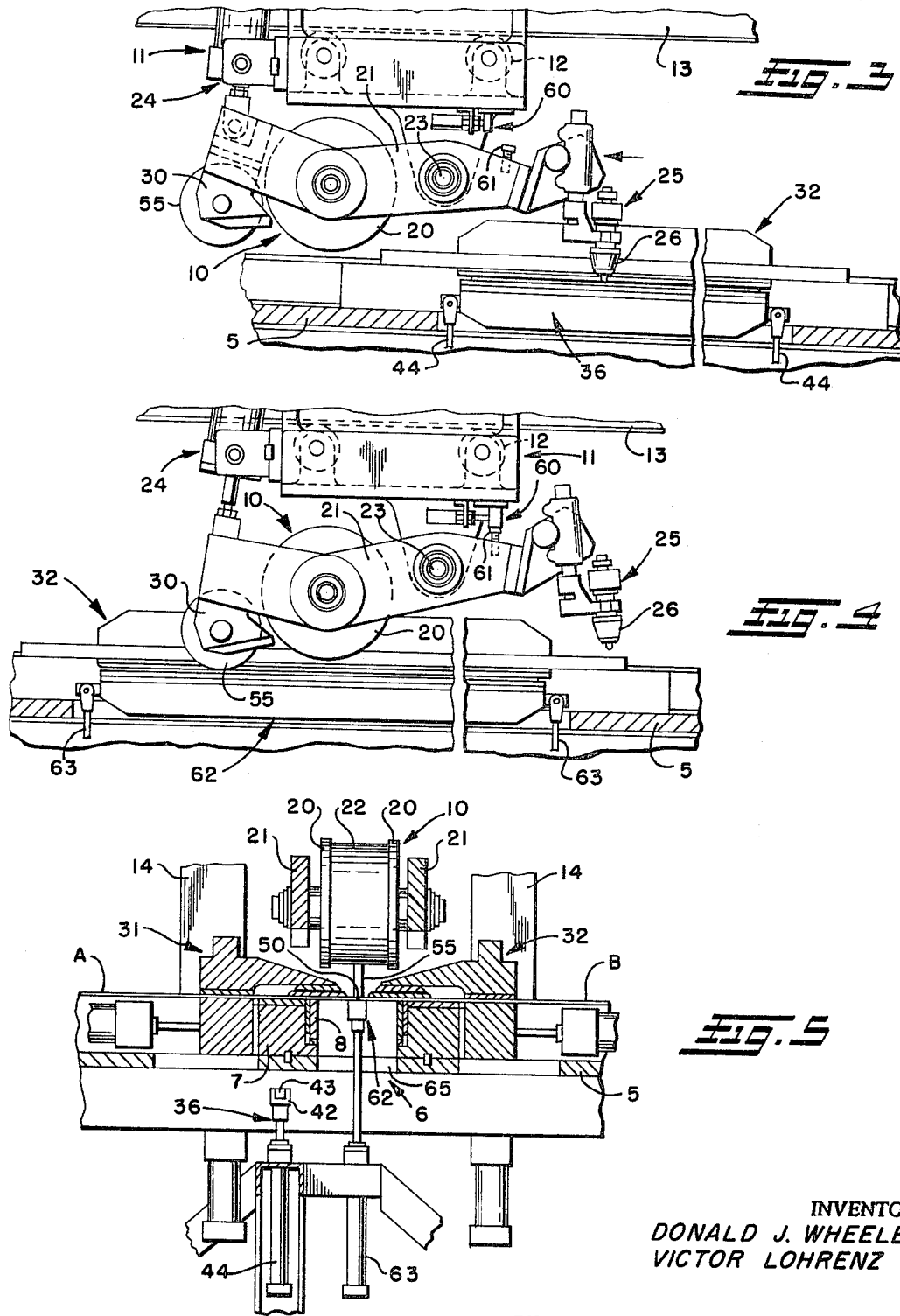

3,394,857
COMBINATION STRIP JOINING AND PLANISHING APPARATUS
Donald J. Wheeler, Kent, and Victor Lohrenz, Bedford, Ohio, assignors to Guild Metal Joining Equipment Co., Bedford, Ohio, a corporation of Ohio
Filed Aug. 30, 1966, Ser. No. 576,090
11 Claims. (Cl. 228—5)

The present invention relates generally, as indicated, to a combination strip joining and planishing apparatus, and more particularly to a novel strip shearing and welding apparatus which incorporates a planish roll for working the strip joints subsequent to welding.

For continuous processing of metal, plastic, or coated metal strips and sheets, the leading end of a new strip is welded to the trailing end of the processed strip subsequent to shearing of the strip ends for establishing perfect mating engagement with each other. The resulting weld bead which is formed during the welding operation must ordinarily be flattened or removed so as not to interfere with certain of the forming operations in the line such as punching and die forming, or cause damage to any of the line processing equipment.

The most common way of reducing the increased weld thickness is to smooth out the weld with a planisher, usually mounted alongside the welder. However, this necessitates the use of expensive precision pinch rolls for indexing the joined strips from the welder to the planisher, as well as separate clamps for securing the strips during planishing, to say nothing of the time which is lost during indexing.

It is accordingly a principal object of this invention to provide a combination strip joining and planishing apparatus, thereby eliminating the need for a separate planishing machine and precision pinch rolls for indexing the joined strips from the welder to the planishing machine.

Another object is to provide such a combination strip joining and planishing apparatus in which the weld clamps also serve to secure the strips during planishing.

A further object is to provide such a combination strip joining and planishing apparatus in which the planish roll, upper shear knives, and welder are all mounted on a single carriage for transverse movement across the strips to be joined, whereby perfect alignment of the planish roll with the welded joint is assured.

A still further object is to provide apparatus of the type described in which the planish roll and upper shear knives are mounted on a common support for pivotal movement into and out of strip pass height, whereby the actuating cylinder for the upper shear knives provides the necessary pressure for the planish roll.

Another object is to provide such a combination strip joining and planishing apparatus in which the planish roll is journalled in a guide shoe which is adapted to be slidably received between the lower shear knives for accurately locating the planish roll with respect to the center line of the welded joint.

Yet another object is to provide such a combination strip joining and planishing apparatus in which the weld backup and planish backup are mounted on the same support for lateral shifting of one or the other of such backups into and out of operating position directly below the welded strip joint.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principles of the invention may be employed.

In such annexed drawing:

FIG. 1 is a longitudinal vertical section through a preferred form of combination strip joining and planishing apparatus constructed in accordance with this invention;

FIG. 2 is a transverse vertical section through the apparatus of FIG. 1 taken on the plane of the line 2—2 thereof; and FIGS. 3–5 are schematic diagrams showing the manner of welding and planishing by the apparatus of this invention.

Referring now in detail to the drawing and first especially to FIGS. 1 and 2, the main frame for the combination strip joining and shearing apparatus 1 illustrated herein by way of example is generally indicated at 2, mounted on wheels 3 supported by guide rails 4 for movement between two or more strip processing lines. A reversible motor 9 or the like may be carried by the main frame 2 for driving the wheels 3 in opposite directions. However, it should be understood that the main frame 2 may be rigidly mounted for use in a single processing line, if desired. A base plate 5 on the main frame 2 supports a lower shear assembly 6, preferably in the form of a pair of laterally spaced shear blocks 7 each having a stationary shear knife 8 attached thereto.

Mounted overhead is an upper shear assembly 10, supported by a carriage 11 for transverse movement across the strips being processed, during which the upper shear assembly 10 cooperates with the lower shear assembly 6 to shear the strip ends for proper mating engagement therebetween. The carriage 11 has a plurality of rollers 12 which ride on rails 13 carried by fixed supports 14 bolted or otherwise secured to the main frame 2. Movement of the carriage 11 back and forth along the rails 13 may be accomplished as by means of a reversible motor 15 mounted at one end of the rails 13 and suitably coupled to a drive screw 16 having threaded engagement with a ball nut 17 fixed to the carriage 11.

The upper shear assembly 10 may comprise a pair of circular slitter knives 20 journalled between a pair of support arms 21 with a spacer 22 between the circular slitter knives 20. The support arms 21 are attached to the carriage 11 as by means of a pivotal connection 23, whereby actuation of a piston-cylinder assembly 24 in opposite directions will cause lowering and raising of the upper shear assembly 10 into and out of strip pass height. As perhaps best seen in FIG. 1, the cylinder 18 of the piston-cylinder assembly 24 is pivoted to the carriage 11 while the free end of the piston rod 19 is pivoted to one end of the support arms 21.

Also supported by the carriage 11, preferably on the same support arms 21 which carry the upper shear assembly 10 but on the opposite side of the pivotal connection 23 is a weld head assembly 25 for securing the strip ends together subsequent to the shearing operation. Because the weld head assembly 25 and upper shear assembly 10 are mounted on the same carriage 11, the weld head assembly 25 will always move in the same transverse path across the strips taken by the upper shear assembly 10, thereby assuring perfect alignment of the weld head assembly 25 with the sheared edges of the strips. Moreover, by mounting the weld head assembly 25 and upper shear assembly 10 at opposite ends of the same support arms 21, lowering of the upper shear assembly 10 into strip pass height will automatically raise the weld head assembly 25 out of strip pass height, and vice versa. This eliminates the necessity of having to provide separate carriages and actuators for the weld head assembly 25 and upper shear assembly 10 at a substantial savings in cost, and saves considerable time in positioning the weld head assembly 25 and upper shear assembly 10. Although the weld head assembly 25 shown is in the form of a torch 26, it should be understood that other types of welding assemblies may be used, such as a seam welding wheel, spot welding electrodes, spot stitch equipment, gas welding apparatus, or flash butt welding apparatus, depending upon the type of weld desired. For guiding the movement of the upper shear assembly 10 between the lower shear assembly 6, a guide shoe 30 may project downwardly from the support arms 21 immediately behind the upper shear assembly 10 for receipt between the stationary shear knives 8.

During both the shearing and welding operations, the strips are clamped in place by a pair of clamp assemblies 31 and 32, the clamp assembly 31 being the exit clamp assembly for clamping the processed strip A adjacent its trailing end; and the clamp assembly 32 being the entry clamp assembly for clamping the new strip B adjacent its leading end. The clamp assemblies 31 and 32 may be of identical construction, each including a platen 33 and a clamping beam 34 mounted for horizontal indexing by actuation of an indexing cylinder 37 between a shearing position whereat the nose 35 of the clamping beam 34 firmly presses the adjacent strip end against the associated shear block 7 and a welding position whereat the clamping nose 35 substantially overhangs such shear block 7 for pressing the strip end firmly against a weld backup bar 36. The clamping beam 34 is also mounted for vertical movement toward and away from its associated platen 33 for clamping and releasing of the respective strips A and B as desired through actuation of a post cylinder 38 attached to the platen 33 by a bracket 39.

The weld backup bar 36 may be of the usual construction, including an elongated steel bar 42 with a copper insert 43 and having its ends supported by piston-cylinder assemblies 44 for raising and lowering of the weld backup bar 36 into and out of the weld position, as desired. The actuating cylinders 44 may be supported by a carriage 45 for transverse movement of the weld backup bar 36 away from the center line of the stationary shear knives 8 during the strip shearing and other operations to be later described. For guiding the movement of the weld backup carriage 45, rollers 46 may be provided which engage I-beam rails 47 which form part of the structure of the main frame 2, and a suitable drive motor 48 may be supported by the carriage 45 and operatively connected to one of the roller shafts 49 for driving the carriage 45 in opposite directions.

During welding, a weld bead 50 is formed at the joint between the two strips A and B which if not removed or substantially flattened may interfere with certain of the strip processing operations or perhaps even cause damage to certain of the strip processing equipment. Accordingly, a planish roll 55 is provided, preferably mounted on the same carriage 11 which supports the upper shear assembly 10 and weld head assembly 25 so as to eliminate the need for a separate planishing machine as well as precision pinch rolls and drive therefor to index the strips from the welder to the planishing machine. Moreover, the planish roll 55 may even be supported by the same support arms 21 which carry the upper shear assembly 10 and weld head assembly 25, preferably journalled in the guide shoe 30 outwardly of the upper shear assembly 10 and projecting somewhat below the upper shear assembly 10 as shown, to permit use of the piston-cylinder assembly 24 which raises and lowers the upper shear assembly 10 and weld head assembly 25 for supplying the necessary planishing pressure. This also permits the clamp assemblies 31 and 32 which are used during both welding and shearing to serve as the planish clamps. A hydraulically actuated stop 60 attached to the lower portion of the carriage 11 may be provided for locating the planish roll 55 in the operative position upon engagement by a stop pin 61 extending upwardly from one of the support arms 21.

For supporting the underside of the strips during planishing, there is provided a lower steel backup bar 62, preferably mounted on the same carriage 45 as the weld backup bar 36 for transverse movement into and out of operating position, and supported for vertical movement by piston-cylinder assemblies 63.

The structure of the combination strip joining and planishing apparatus 1 having thus been set forth, the operation thereof will now be described.

*Operation*

During processing of a metal or like strip of material, both the exit and entry clamp assemblies 31 and 32 are preferably in the retracted shear position shown in FIG. 2, but with the clamping beams 34 vertically spaced from the platens 33 to permit unobstructed movement of the strip to the various processing stations in the line, such as reducing or forming rolls, brushes, cut-offs and blanking, stamping or other processing equipment. However, when the end of the strip being processed is reached, the post cylinder 38 for the exit clamp assembly 31 is actuated to bring its associated clamping beam 34 into clamping engagement with the strip, and the leading end of a new strip is fed from an uncoiler or the like, not shown, into the entry clamp assembly 32 and similarly clamped. Now the strip ends are ready for shearing, which is accomplished by causing the carriage 11 to traverse the strips with the upper shear assembly 10 positioned at strip pass height as shown in FIGS. 1 and 2. During shearing, the scrap material which is cut from the strips is deflected downwardly by the guide shoe 30 through a slot 65 in the base plate 5.

At the termination of the shear stroke, the clamp assemblies 31 and 32 are indexed to the shearing position, FIG. 5, and the carriage 45 is moved to locate the weld backup bar 36 directly below the strip joint. Next the piston-cylinder assemblies 44 are actuated for raising the weld backup bar 36 into engagement with the under sides of the strips A and B for pressing the strip ends against the noses 35 of the clamping beams 34 to flatten the strip ends prior to joining. Now the weld head assembly 25 is moved into position through actuation of the piston-cylinder assembly 24, during which the upper shear assembly 10 is automatically retracted, and the carriage 11 is caused to traverse the strips in the reverse direction for welding of the strip ends together.

After completion of the welding stroke, the stop 60 is moved into position for engagement by the stop pin 61, and the piston-cylinder assembly 24 is actuated to lower the planish roll 55 (see FIG. 4). Since the welded joint is on the center line of the lower shear knives 8, the planish roll 55 which is journalled in the guide shoe 30 is automatically lined up on the weld. Next the weld backup bar 36 is lowered out of position and the carriage 45 caused to move to a position locating the planish backup bar 62 directly beneath the welded joint. Then the piston-cylinder assemblies 63 are actuated to raise the planish backup bar 62 into engagement with the under side of the welded joint, FIG. 5, and the carriage 11 is again caused to traverse the strips for planishing of the welded joint. When the planishing operation is completed, the strip clamp assemblies 31 and 32 may be opened to permit continued processing of the joined strips.

As is now apparent, the combination strip joining and shearing apparatus of the present invention is of a unique construction which incorporates a shearing apparatus, welding apparatus, and planisher in a single machine, thereby eliminating the necessity of having to provide separate machines mounted along-side each other for performing each of these operations, at a substantial savings in cost. Moreover, the shearing, welding, and planishing apparatus are preferably mounted on a common support pivotally supported on a single carriage for transverse movement across the strips, whereby accurate alignment between the sheared strip ends and welding and planishing apparatus is assured, thus eliminating the need for expensive precision pinch rolls and roll drives for indexing the strips from one apparatus to the other. In addition, such a novel construction permits the same clamps to be used during planishing as well as shearing and welding, and the shear actuating cylinder provides the pressure for the planish roll. In actual practice, it has been found that with the apparatus of the present invention it is possible to save approximately two minutes per joint as compared with conventional strip joining apparatus now being used.

Other modes of applying the principles of the invention may be employed, change being made as regards the details described, provided the features stated in any of the following claims or the equivalent of such be employed.

We therefore, particularly point out and distinctly claim as our invention:

1. In an apparatus for joining strip material and the like, a frame, a stationary shear assembly supported by said frame at a shear position, a carriage, means mounting said carriage above said stationary shear assembly for movement therealong, a support member pivotally mounted on said carriage, a movable shear assembly carried by one end of said support member for swinging movement of said movable shear assembly into and out of strip pass height, means for pivoting said support member to bring said movable shear assembly into strip pass height for cooperation with said stationary shear assembly to shear strip material at such shear position during such movement of said carriage, and a planish roll also carried by said one end of said support member outwardly of said movable shear assembly and projecting slightly below said movable shear assembly, said means for pivoting said support member being adapted to supply planishing pressure for said planish roll.

2. The apparatus of claim 1 wherein said support member is pivoted to said carriage between its ends, and there is a welding assembly carried by the other end of said support member, whereby lowering of said movable shear assembly and planish roll toward strip pass height will automatically retract said welding assembly and vice versa.

3. The apparatus of claim 1 further comprising a pair of strip clamping means mounted on said frame for movement away from and toward each other between a first position whereat the strips clamped thereby are sheared to a second position whereat the sheared strip ends are welded together and the weld is planished.

4. The apparatus of claim 1 wherein said stationary shear assembly comprises a pair of elongated spaced apart shear knives between which said upper shear assembly is adapted to be received, and there is a guide shoe means mounted on said support member outwardly of said movable shear assembly for guiding the movement of said movable shear assembly between said stationary shear knives, said planish roll being journalled in said guide shoe means for accurately locating said planish roll with respect to the center line between said stationary shear knives.

5. The apparatus of claim 1 further comprising means for precisely locating said planish roll at strip pass height comprising a stop pin carried by said support arms on the side of the pivot opposite said planish roll, and a hydraulically actuated stop means carried by said carriage which is adapted to be moved into and out of alignment with said stop pin.

6. The apparatus of claim 1 further comprising a planish backup bar, and means mounting said planish backup bar for movement into and out of position in line with said planish roll and engaging the underside of such strips for supporting the same during planishing.

7. The apparatus of claim 6 further comprising a second carriage mounted for transverse movement below said stationary shear assembly, said planish backup bar being mounted on said second carriage for transverse movement into and out of line with said planish roll.

8. The apparatus of claim 7 further comprising a welding assembly, means mounting said welding assembly for transverse movement across the sheared ends of such strips, and a weld backup bar mounted on said second carriage laterally spaced from said planish backup bar for transverse movement into and out of line with said welding assembly, and means for raising and lowering said weld backup bar into and out of engagement with such strips to support the same during welding.

9. The apparatus of claim 3 wherein each of said strip clamping means comprises a platen, means mounting said platen for horizontal movement between such first and second positions, an elongated clamping beam, and means mounting said clamping beam on said platen for vertical movement toward and away from said platen, said clamping beam substantially overhanging said platen by a distance sufficient to permit said clamping beam to press the respective strips firmly against said stationary shear assembly when said strip clamping means is in the first position, and firmly against a weld backup bar and planish backup bar successively moved into position below the sheared strip ends when said clamping means is in the second position.

10. The apparatus of claim 3 wherein said stationary shear assembly comprises a pair of elongated spaced apart shear knives between which said upper shear assembly is adapted to be received, and there is a guide shoe means mounted on said support member outwardly of said movable shear assembly for guiding the movement of said movable shear assembly between said stationary shear knives, said planish roll being journalled in said guide shoe means for accurately locating said planish roll with respect to the center line between said stationary shear knives, means for precisely locating said planish roll at strip pass height comprising a stop pin carried by said support arm on the side of the pivot opposite said planish roll, and a hydraulically actuated stop carried by said carriage which is adapted to be moved into and out of alignment with said stop pin, a planish backup bar, and means mounting said planish backup bar for movement into and out of position in line with said planish roll and engaging the underside of such strips for supporting the same during planishing.

11. In an apparatus for joining strip material and the like, a frame, a pair of strip clamping means mounted on said frame for movement toward and away from each other between a first position whereat the strips clamped thereby are sheared and a second position whereat the sheared strip ends are welded and planished, a pair of stationary shear knives located at such first position, a movable shear assembly, means mounting said movable shear assembly for transverse movement across the strips at such shear position for cooperation with said stationary shear knives to shear such strips during such transverse movement, a welding assembly, means mounting said welding assembly for movement in the same transverse path as said movable shear assembly for joining the sheared strip ends together when in the welding position, a planish roll, and means mounting said planish roll for movement in the same transverse path as said welding assembly for planishing the strip joint subsequent to welding, a carriage mounted for transverse movement below said stationary shear knives, a weld backup bar and planish backup bar mounted on said carriage in spaced apart relation for transverse movement into and out of line with said welding assembly and planish roll, respectively, and means for raising and lowering said weld backup bar and planish backup bar into and out of engagement with such strips to support such strips during welding and planishing, respectively.

References Cited

UNITED STATES PATENTS

| 2,782,488 | 2/1957 | Anderson | 29—33.21 X |
| 2,143,969 | 1/1939 | Biggert | 29—33.21 X |
| 2,344,534 | 3/1944 | Bucknam | 29—33.21 X |

RICHARD H. EANES, JR., *Primary Examiner.*